(12) United States Patent  
Powers et al.

(10) Patent No.: US 6,644,024 B1  
(45) Date of Patent: Nov. 11, 2003

(54) EXHAUST SYSTEM FOR A MARINE ENGINE

(75) Inventors: Loren T. Powers, Stillwater, OK (US); James M. Horak, Stillwater, OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/127,132

(22) Filed: Apr. 22, 2002

(51) Int. Cl.$^7$ ................................................. F01N 3/02
(52) U.S. Cl. ........................... 60/320; 60/298; 60/321; 60/323; 440/88; 440/89
(58) Field of Search ........................ 60/320, 298, 321, 60/323, 305, 324; 440/88, 89

(56) References Cited

U.S. PATENT DOCUMENTS

| | | | |
|---|---|---|---|
| 4,573,318 A | 3/1986 | Entringer et al. | 60/310 |
| 4,687,450 A * | 8/1987 | Bland et al. | 440/89 |
| 4,734,071 A * | 3/1988 | Zemlicka et al. | 440/89 |
| 4,759,181 A | 7/1988 | Biritz | 60/321 |
| 4,801,283 A | 1/1989 | Ruhnke | 440/88 |
| 4,845,945 A | 7/1989 | Widmer et al. | 60/310 |
| 4,977,741 A | 12/1990 | Lulloff et al. | 60/310 |
| 4,997,399 A * | 3/1991 | Nakayasu et al. | 440/88 |
| 5,109,668 A | 5/1992 | Lindstedt | 60/310 |
| 5,820,426 A * | 10/1998 | Hale | 440/88 |
| 6,030,263 A * | 2/2000 | Uchino et al. | 440/89 |
| 6,290,558 B1 | 9/2001 | Erickson | 440/89 |
| 6,454,622 B2 * | 9/2002 | Mashiko et al. | 440/89 |

* cited by examiner

*Primary Examiner*—Thomas Denion
*Assistant Examiner*—Binh Tran
(74) *Attorney, Agent, or Firm*—William D. Lanyi

(57) ABSTRACT

An exhaust system for a marine engine provides individual exhaust gas conduits that are maintained separately from water conduits until the individual exhaust gas conduits can be combined within a common exhaust gas conduit. This combination of exhaust gas streams allows the amplitude of negative pressure pulses to be damped, by combination with each other, prior to the mixing of cooling water with the exhaust gas streams. Later, the combined exhaust gas stream can be mixed with a combined water stream.

20 Claims, 5 Drawing Sheets

EXHAUST SYSTEM FOR A MARINE ENGINE

BACKGROUND OF THE INVENTION

1. Field of the Invention

The present invention is generally related to an exhaust system for a marine engine and, more particularly, to an exhaust system that mixes the dry exhaust gases from two groups of cylinders prior to mixing the exhaust gases with cooling water.

2. Description of the Prior Art

Various types of exhaust system for marine engines are known to those skilled in the art. Typically, exhaust gases are conducted from cylinders of the engine to an exhaust pipe while maintained in thermal communication with cooling water previously used to cool heat producing components of the engine. The cooling water may be contained within a water jacket surrounding various exhaust components of the engine or mixed directly with the exhaust gases.

U.S. Pat. No. 6,290,558, which issued to Erickson on Sep. 18, 2002, discloses an exhaust elbow with a water trap for a marine propulsion system. The exhaust elbow is provided with a water trap section that defines a water collection cavity. Within the water trap section, a barrier extends downward into the water collection cavity to define first and second exhaust passages. When water begins to collect in the water collection cavity, the cross sectional area of the exhaust passage is reduced and the velocity of exhaust gases passing through the exhaust passage is increased. The water collection cavity is shaped to be easily cleared when exhaust gas pressure increases as the engine speed increases.

U.S. Pat. No. 4,845,945, which issued to Widmer et al on Jul. 11, 1989, discloses an exhaust elbow trough. A water jacketed exhaust elbow for a marine propulsion system includes an intake exhaust passage communicating with a discharge exhaust passage, a water jacket around the exhaust passages, and a trough member extending longitudinally along a water channel along the exterior of the discharge exhaust passage to guide water therealong to mix with exhaust at the end of the discharge exhaust passage. The trough member extends beyond the exhaust tip of the discharge exhaust passage and has a sharp edge providing a clean parting surface for the coolant water and preventing ingestion of water back into the discharge exhaust passage.

U.S. Pat. No. 5,109,668, which issued to Lindstedt on May 5, 1992, discloses a marine exhaust manifold and elbow. A marine exhaust assembly includes a manifold portion, an elbow portion, a water jacket portion, and exhaust runner walls, providing a smooth continuous transition of exhaust gas flow from intake exhaust passages in the manifold portion to transfer exhaust passages in the elbow portion around a bend to a discharge exhaust passage, minimizing turbulent flow of exhaust through the manifold portion and elbow portion. Each transfer exhaust passage has its own water supply inlet at the upstream end of the respective intake exhaust passage. An upper vent includes a steam outlet opening in the water jacket at the high point of the elbow portion, and a steam exhaust channel extending along the top exterior of the water jacket portion in a raised bead above and parallel to an upper water flow passage and directing steam to the end of the discharge exhaust passage to mix with water and exhaust thereat. Wall supports assist in directing cooling water up through the water jacket to the top of the elbow bend, and also prevent wall collapse during lost foam stainless steel casting.

U.S. Pat. No. 4,977,741, which issued to Lulloff et al on Dec. 18, 1990, discloses a combination exhaust manifold and exhaust elbow for a marine propulsion system. The combination exhaust manifold and exhaust elbow for an internal combustion engine includes an exhaust cavity for receiving exhaust from the engine, an exhaust passage leading from the exhaust cavity, and an exhaust discharge outlet. A first water jacket is provided around the exhaust cavity and a second water jacket is provided around the exhaust discharge passage. A dam is provided between the first and second water jackets, having a passage therein for allowing fluid communication between the first and second water jackets. A warm water inlet is provided in the first water jacket around the exhaust cavity for receiving cooling water which has been warmed by the engine, in which flow is controlled by a temperature sensitive thermostat. A cold water inlet is provided adjacent the discharge exhaust passage. The cold water inlet is disposed either upstream or downstream of the dam adjacent the exhaust passage, and allows cold bypass water to be discharged without the necessity of the cold water flowing through the entire assembly, so as to prevent moisture from condensing out of the exhaust in the exhaust cavity.

U.S. Pat. No. 4,759,181, which issued to Biritz on Jul. 26, 1988, describes a manifold, apparatus and system for exhaust transfer and cooling of V-type marine engines. A manifold and cooling system for V-type marine engines utilizing two novel exhaust manifold/cooling jacket units, each unit having separate cavities and a flow-through heat exchanger whereby engine coolant circulates through the engine block pumped by a water pump first into a forward cavity of one unit in fluidic communication with an exhaust manifold channel wall the traveling adjacent to the heat exchanger into a rearward cavity and into fluidic communication with a second portion of an exhaust manifold channel wall and then out of the unit via piping to a second unit into a rear cavity with similar fluidic communication with a second exhaust manifold channel wall than along a heat exchanger into a forward cavity and further channel wall contact, out of this unit and back into an engine block to complete the coolant circuit. Raw water is pumped through each heat exchanger and expelled back to the sea.

U.S. Pat. No. 4,801,283, which issued to Ruhnke on Jan. 31, 1989, discloses a mixing tube assembly for a marine propulsion system. In a marine propulsion system including an internal combustion engine, a mixing tube assembly is disposed between an exhaust manifold and a discharge pipe for discharging mixed water and exhaust. The mixing tube assembly is adapted for connection to the exhaust manifold by means of a resilient connector member, such as a flanged rubber boot. This form of connection allows the adjacent surfaces of so the mixing tube and the manifold to be non-machined, and provides suspension of the mixing tube from the manifold. The mixing tube includes an exhaust passage having a water jacket therearound for cooling exhaust passing therethrough. A water inlet is provided for introducing water into the water jacket. Water is discharged from the water jacket through a circumferential water discharge outlet, and exhaust is discharged from the exhaust passage through an exhaust outlet. A mixing cavity is disposed downstream of the water jacket and the exhaust passage for receiving discharged water and exhaust and mixing the water with the exhaust prior to discharge through a discharge outlet.

U.S. Pat. No. 4,573,318, which issued to Entringer et al on Mar. 4, 1986, discloses an exhaust elbow for a marine propulsion system. A marine propulsion system is provided with an exhaust elbow having an intake exhaust passage extending upwardly from the engine and communicating through a bend with a discharge exhaust passage, a water jacket having pockets around the exhaust passages for cooling the latter. A central channel extends longitudinally along the exterior of the exhaust passages to guide water therealong to the end of the discharge exhaust passage to mix with exhaust thereat. The central channel has a pair of sidewalls extending longitudinally and laterally tapered away from each other at the outer end of the discharge exhaust passage to create an outward draw for the central channel to minimize break-up of longitudinally outward water flow and maintain the end tip of the discharge exhaust passage dry and prevent water ingestion and creeping back into the discharge exhaust passage due to pulsations of the engine. Dam and port structure is also provided enabling faster heating of the exhaust passage and in turn minimizing condensation within the elbow which may otherwise ingest back into the engine.

The patents described above are hereby expressly incorporated by reference in the description of the present invention.

SUMMARY OF THE INVENTION

An exhaust system for a marine engine, made in accordance with the preferred embodiment of the present invention, comprises a water cavity disposed in thermal communication with a heat producing component of the marine engine. It also comprises first and second exhaust producing components of the engine and first and second exhaust gas conduits connected in fluid communication with the first and second exhaust gas producing components, respectively, of the engine. It further comprises first and second water conduits connected in fluid communication with the water cavity of the engine. The exhaust system further comprises a first junction point at which the first and second exhaust gas conduits are connected in fluid communication with each other to form a third exhaust gas conduit. A preferred embodiment of the present invention comprises a second junction point at which the third exhaust gas conduit is connected in fluid communication with a water conduit from the group consisting of the first water conduit, second water conduit, and the first water conduit combined with the second water conduit.

Certain embodiments of the present invention can further comprise a third junction point at which the first and second water conduits are connected in fluid communication with each other to form a third water conduit. The third exhaust gas conduit is connected in fluid communication with the third water conduit at the second junction point in a preferred embodiment of the present invention. The water cavity of the engine can comprise a water jacket formed within a block of the marine engine or other water conduits used to direct a flow of cooling water. In a preferred embodiment, the first and second exhaust gas producing components comprises first and second cylinders, respectively. In certain embodiment of the to present invention, the first and second exhaust gas producing components comprise first and second plurality of cylinders, respectively, of the marine engine. The first plurality of cylinders can be disposed on a starboard side of the marine engine and the second plurality of cylinders can be disposed on a port side of the engine. The marine engine can be a V-shaped engine.

The first and second exhaust conduits are disposed in thermal communication with the first and second water conduits between their respective first and second exhaust gas producing components, respectively, and the first junction point. The first and second water conduits are disposed in parallel relation with each other between the water cavity of the marine engine and the second junction point.

Operation of the present invention results in the performance of a method for controlling the flow of exhaust in an exhaust system of a marine engine which comprises, in a preferred embodiment, the steps of conducting a first stream of exhaust gas from a first exhaust gas producing component of the marine engine to a first junction point. It also comprises the step of conducting a second stream of exhaust gas from a second exhaust gas producing component of the marine engine to the first junction point. It then mixes the first and second streams of exhaust gas together at the first junction point to form a combined flow of exhaust gas. A preferred embodiment of the method of the present invention further comprises conducting first and second streams of water from the water cavity of the marine engine to a second junction point, with the first and second streams of water begin disposed, respectively, in thermal communication with the first and second streams of exhaust gas. The present invention then mixes the combined flow of exhaust gas, at the second junction point, with a flow of water selected from the group consisting of the first stream of water, the second stream of water, and a combination of the first and second streams of water.

In a particularly preferred embodiment of the present invention, the method further comprises the step of mixing the first and second streams of water together at a third junction point to form a combined flow of water. The combined flow mixing step comprises the step of mixing the combined flow of exhaust gas with the combined flow of water at the second junction point. The water cavity can comprise a water jacket formed within a block of the marine engine. The first and second exhaust gas producing components can comprise, respectively, first and second pluralities of cylinders of the marine engine. The first and second pluralities of cylinders can be disposed on the starboard side and port side, respectively, of the marine engine. The marine engine can be a V-shaped engine.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
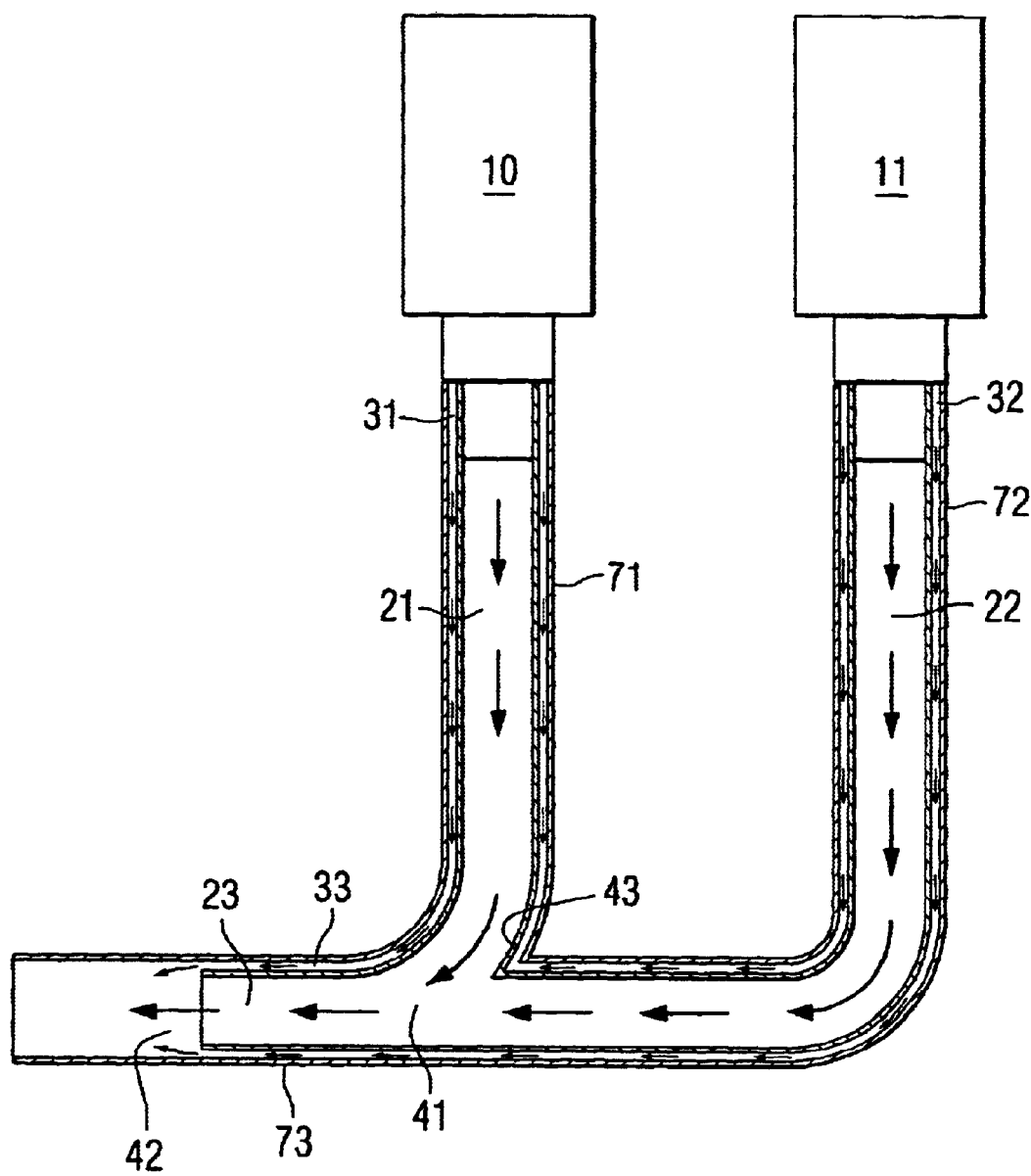
FIG. 1 shows an asymmetrical embodiment of the present invention.

Throughout the description of the preferred embodiment of the present invention, like components will be identified by like reference numerals.

FIG. 1 shows the exhaust system of the present invention in a highly schematic representation. Port and starboard exhaust elbows, 10 and 11, are used to conduct exhaust gases and cooling water away from a marine engine. A first exhaust gas conduit 21 is connected in fluid communication with a first exhaust gas producing component, which can include one or more cylinders of the marine engine that are connected in fluid communication with the exhaust elbow 10. A second exhaust gas conduit 22 is connected in fluid communication with a second exhaust gas producing component which can comprise a plurality of cylinders that are connected in fluid communication with the second exhaust elbow 11. A first water conduit 31 is connected in fluid communication, through the first exhaust elbow 10, with a water cavity of the marine engine. It should be understood that the water cavity of the marine engine can comprise actual water passages formed in the block of the marine engine, a cooling circuit formed in a heat exchanger associated with the marine engine, or various water conduits that are used in conjunction with the marine engine to direct the flow of cooling water throughout the engine or its associated components. In other words, the water cavity of the marine engine can be any confined volume through which sea or lake water is conducted for the purpose of removing heat from preselected components associated with the marine engine. A second water conduit 32 is connected in fluid communication with the water cavity through the second exhaust elbow 1. A first junction point 41 is provided in the exhaust system. The first junction point 41 is where the first and second exhaust gas conduits, 21 and 22, are connected in fluid communication with each other to form a third exhaust gas conduit 23. A second, junction point 42 is provided at which the third exhaust gas conduit 23 is connected in fluid communication with a water conduit which can be either the first water conduit 31, the second water conduit 32, or a combination of the first and second water conduits, which is formed at the location identified by reference numeral 33. Reference numeral 43 identifies a third junction point at which the first and second water conduits, 31 and 32, are connected in fluid communication with each other to form the third water conduit 33. The third exhaust gas conduit 23 is connected in fluid communication with the third water conduit 33 at the second junction point 42.

The water cavity of the marine engine can comprise a water jacket that is formed within a block of the marine engine, as is well known to those skilled in the art. The water cavity can also comprise other containments, such as heat exchangers or fluid hoses, which are associated with the marine engine for conducting lake or sea water in thermal communication with various heat producing components. The first and second exhaust gas producing components, respectively, comprise either first and second cylinders of the marine engine or, alternatively, first and second pluralities of cylinders of the marine engine. These cylinders can be disposed on the starboard and port sides of the marine engine, respectively, and the marine engine can be a V-shaped engine.

With continued reference to FIG. 1, it can be seen that the first exhaust conduit 21 is disposed in thermal communication with the first water conduit 31 in the region between the first exhaust gas producing component, associated with the marine engine, and the first junction point 41. FIG. 1 also shows that the second exhaust gas conduit 22 is disposed in thermal communication with the second water conduit 32 in the region between the second exhaust gas producing component of the marine engine and the first junction point 41.

The first and second exhaust gas conduits, 21 and 22, are surrounded by associated annular passages of cooling water of the first and second water conduits, 31 and 32, resulting from the concentric relationship between the exhaust gas conduits, 21 and 22, and the water conduits, 31 and 32. The first and second water conduits, 31 and 32, are connected in parallel flow relation with each other between the water cavity of the engine and the second junction point 42.

Figure 2:
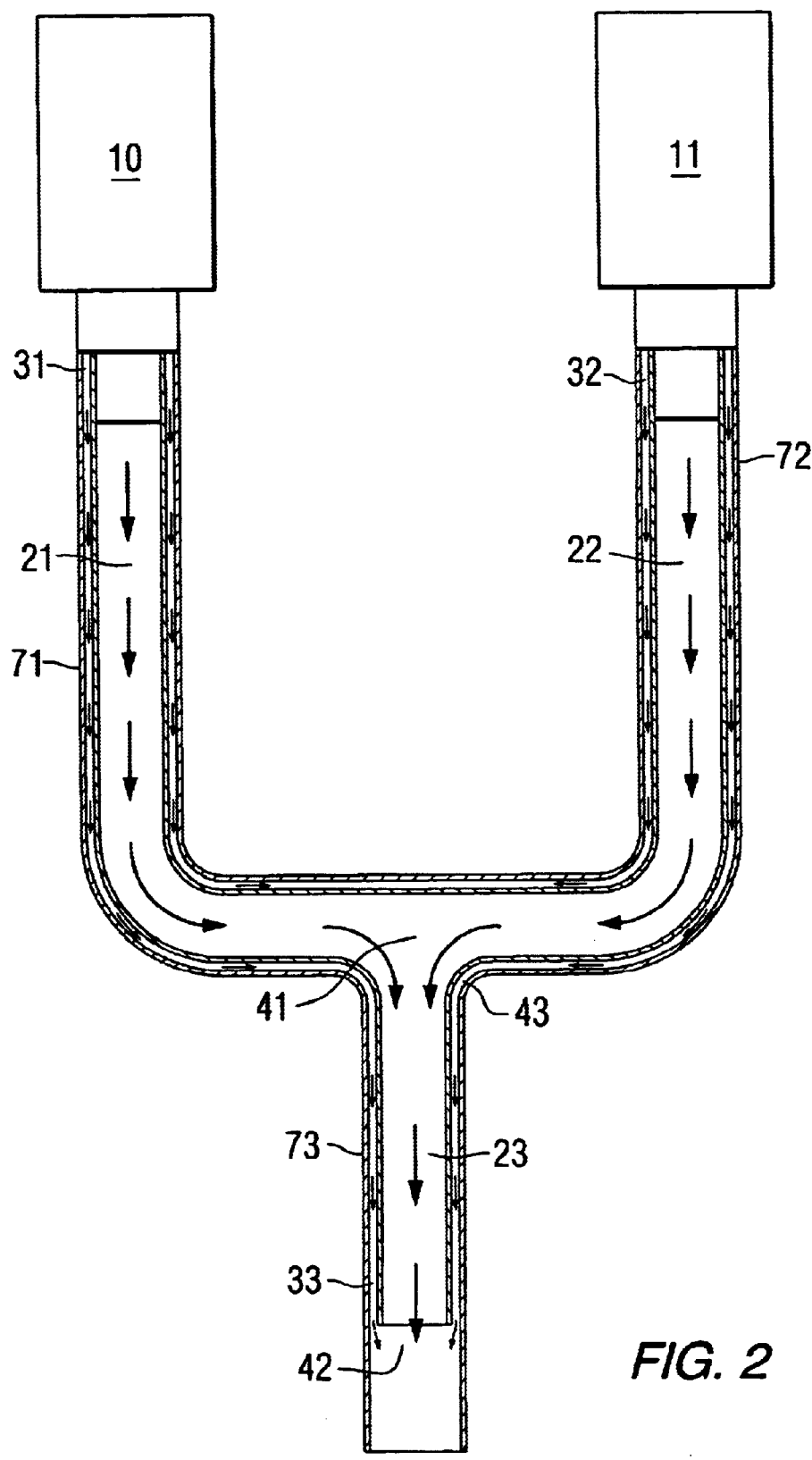
FIG. 2 shows a symmetrical embodiment of the present invention.

FIG. 2 is a slightly different configuration of the present invention. Functionally, the arrangements in FIGS. 1 and 2 operate in a similar manner to first combine the first and second exhaust gas streams together before the exhaust gas is mixed with the water at the second junction point 42. The method performed by the present invention comprises the step of conducting a first stream of exhaust gas, in the first exhaust gas conduit 21, from a first exhaust gas producing component of the marine engine to a first junction point 41. It then conducts a second stream of exhaust gas, through the second exhaust gas conduit 22, from a second exhaust gas producing component of the marine engine to the first junction point 41. The first and second streams of exhaust gas are mixed together at the first junction point 41 to form a combined stream of exhaust gas in the third exhaust gas conduit 23. The present invention also conducts a first stream of water, through the first water conduit 31, from a water cavity of the marine engine to a second junction point, identified by reference numeral 33 in FIG. 2, with the first stream of water being disposed in thermal communication with the first stream of exhaust gas because of the physical arrangement of the first exhaust gas conduit 21 and the first water conduit 31. The present invention also conducts a second stream of water, in the second water conduit 32, from the water cavity of the marine engine to the second junction point 42, with the second stream of water being disposed in thermal communication with the second stream of exhaust gas because of the physical arrangement of the second exhaust gas conduit 22 with the. second water conduit 32. The present invention then mixes the combined stream of exhaust gas in the third exhaust conduit 23, with the stream of water which can consist of the first stream of water, the second stream of water, or a combination of the first and second streams of water if those first and second streams of water are mixed together prior to their being blended with the exhaust gas from the third exhaust gas conduit 23.

With continued reference to FIG. 2, the method of the present invention can further comprise the step of mixing the first and second streams of water at a third junction point, 43, to form a combined stream of water in a combined water conduit 33 prior to the combined stream of water being mixed with the combined stream of exhaust gas passing through the third exhaust gas conduit 23. This mixing of exhaust gas and cooling water would occur at the second junction point 42 shown in FIGS. 1 and 2.

Figure 3:
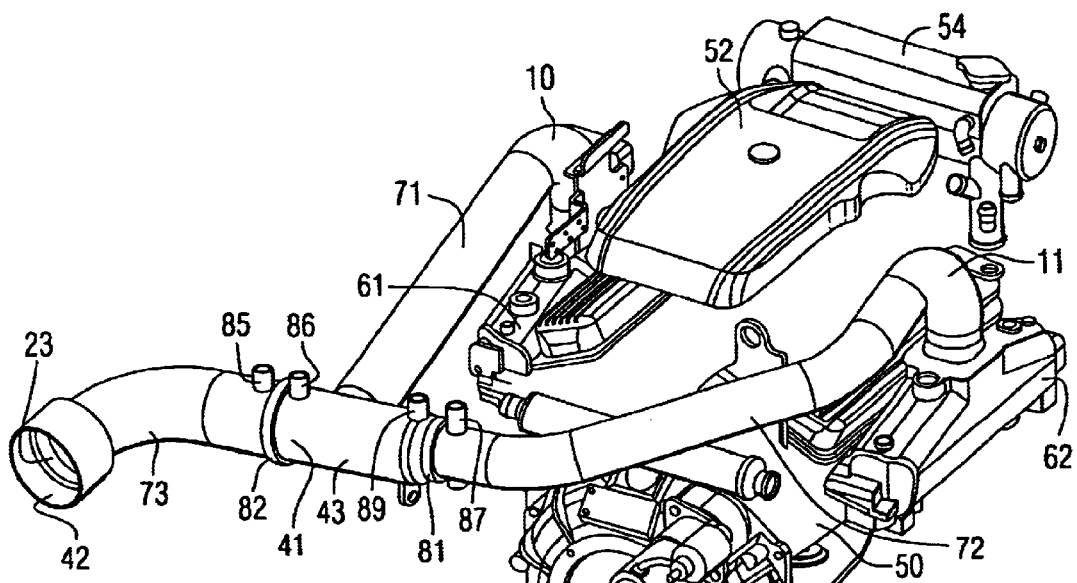
FIGS. 3 and 4 show different views of an engine configured with the embodiment of the present invention shown in FIG. 1.

FIG. 3 illustrates an embodiment of the present invention associated with an engine 50. Also shown in FIG. 3, for purposes of reference, are a cover 52, a heat exchanger 54, a bell housing 56 and first and second exhaust manifolds, 61 and 62, associated with the first and second exhaust elbows, 10 and 11, which are described above in conjunction with FIGS. 1 and 2. The structure of the exhaust and water conduits shown in FIG. 3 will be described in terms of a first portion 71, a second portion 72, and a third portion 73. With reference to FIGS. 1 and 3, the first portion 71 comprises the first exhaust gas conduit 21 and the first water conduit 31 extending between the first exhaust elbow 10 and the containment structure within which the first junction point 41 and the combined water conduit 33 are located. Two connective fasteners, 81 and 82, are used to attach the first portion 71 to the second and third portions, 72 and 73, of the exhaust system. Within the second portion 72, the second exhaust conduit 22 is supported in a central position within an outer pipe to define the annular second water conduit 32. It should be understood that the second water conduit 32 does not pass directly through the first connector 81. Instead, the outer annular water passage is provided with a bypass pipe 87 which allows a water connector (not shown in FIG. 3) to conduct water to the bypass pipe identified by reference numeral 89. This arrangement will be described in greater detail below. A similar arrangement is provided at the juncture between the first portion 71 and the third portion 73, where connector 82 is located. Bypass pipes 85 and 86 allow a bypass conduit to be connected therebetween to direct a water stream around the connector 82. Within portion 73, the exhaust gas is combined within a third exhaust gas conduit 23 and the combined water stream, from the first and second water conduits, 31 and 32, form a combined water stream that passes within the annular conduit, or continued water conduit 33, surrounding the third exhaust gas conduit 23. The second junction point 42 is the location at which the combined exhaust gas stream first mixes with the water stream.

With reference to FIGS. 1–3, it is important to note that the present invention mixes the exhaust gas streams together at a first junction point 41 which is upstream of the second function point 42 where the exhaust gas streams are mixed with the water stream. This allows the pressure pulsations that exists within the first and second exhaust gas conduits, 21 and 22, to be combined together prior to the introduction of water into the exhaust gas stream. The combination of the first and second exhaust gas streams decreases the amplitude of pressure pulses that could otherwise induce the flow of water, in a reverse direction, through the exhaust gas system back toward the exhaust manifolds, 61 and 62. Only after the first and second exhaust gas conduits, 21 and 22, are connected together at the first junction point 41 is the combined gas stream allowed to be mixed, at the second junction point 42, with the cooling water that flows through the first and second water conduits, 31 and 32.

Figure 4:
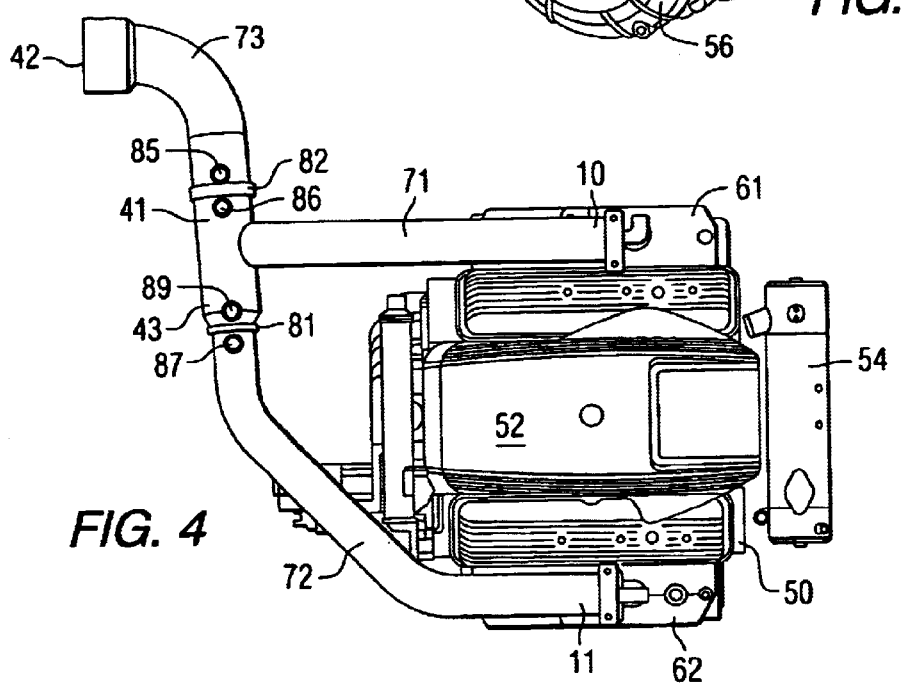

FIG. 4 is a top view of the engine and exhaust system shown in FIG. 3. The first exhaust gas stream passes through the first portion 71 of the exhaust system surrounded by the first water stream as described above in conjunction with FIGS. 1 and 2. Similarly, the second exhaust gas conduit 22 passes through the second portion 72 of the exhaust system surrounded by the second water conduit 32. The first and second exhaust gas streams are mixed at the first junction point where the first and second exhaust gas conduits, 21 and 22, are joined. The first and second water streams, passing through the first and second water conduits, 31 and 32, can be mixed at the location identified by reference numeral 33 or, alternatively, at a different location within the exhaust system. It is important to note that the exhaust gas streams, passing through exhaust gas conduits 21 and 22, d are not mixed with the cooling water streams until the two exhaust gas streams are first combined together at the first junction point 41.

Figure 5:
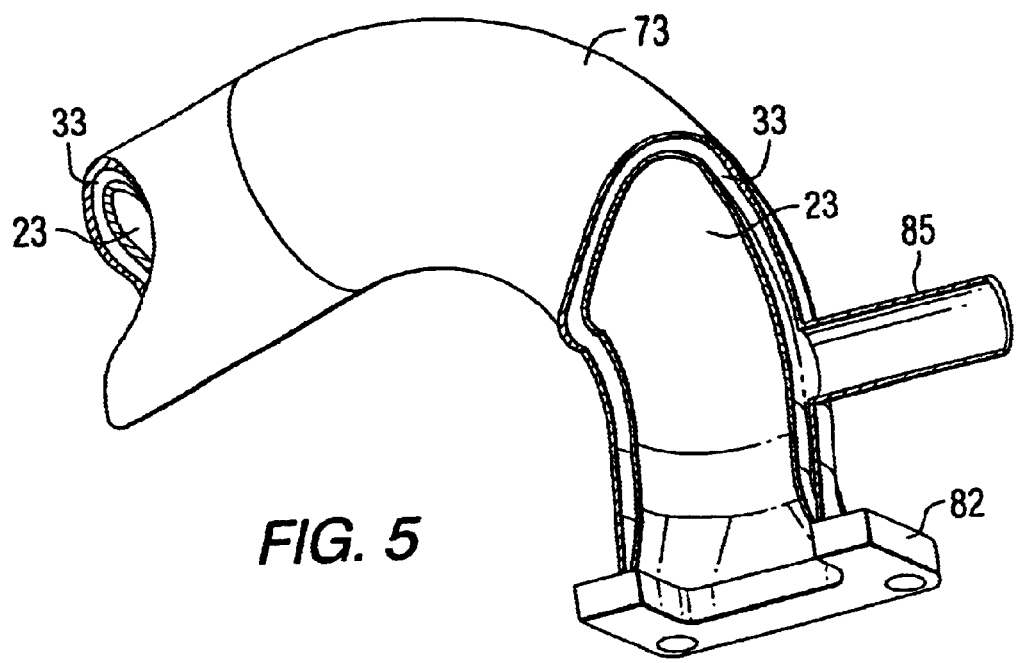
FIG. 5 is a partial sectioned view of a portion of the exhaust system shown in FIGS. 3 and 4.

FIG. 5 shows the third portion 73 of the exhaust system with a flange provided as the connective element 82 to allow the third portion 73 to be attached to the first portion 71 as shown in FIGS. 3 and 4. The third portion 73 is sectioned in FIG. 5 to show the annular combined water conduit 33 surrounding the third exhaust gas conduit 23. Bypass pipe 85, as described above, is provided to allow water to bypass the joint 82 between the first and third portion, 71 and 73, while maintaining the flow of cooling water from the water cavity of the engine 50 toward the second junction point 42 described above. It should be noted that the exhaust gas stream passing through the third portion 73 is maintained separate and independent from the water stream through most of its length. The exhaust gas and cooling water are not mixed together until they reach the second junction point 42 downstream from the section view of FIG. 5. Water that flows through bypass pipe 86, described above in conjunction with FIGS. 3 and 4, is directed into bypass pipe 85 through the use of a short U-shaped pipe or hose (not shown in the figures).

Figure 6:
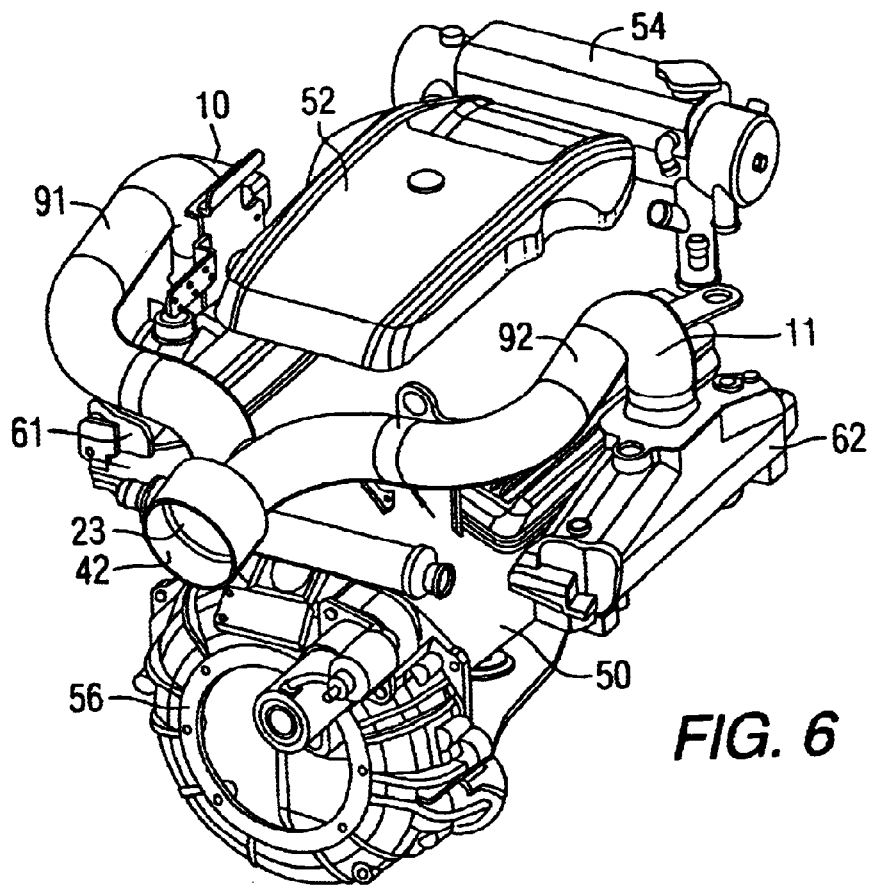
FIG. 6 shows a marine engine configured with the embodiment of the present invention shown in FIG. 2.

FIGS. 1, 3, and 4 illustrate an embodiment of the present invention which is generally asymmetrical. In other words, the exhaust streams are directed from the first and second exhaust elbows, 10 and 11, toward the aft region of a marine vessel and then toward the port side of the vessel. FIGS. 2 and 6 illustrated an embodiment of the present invention that is generally symmetrical about a centerline of the marine vessel and of the engine.

In FIG. 6, the exhaust system comprises a first portion 91 and a second portion 92 that join together to provide the first and second junction points, 41 and 42. With reference to FIGS. 2 and 6, the first exhaust gas conduit 21 and the first water conduit 31 are contained within the first portion 91 of the exhaust system, with the first exhaust gas conduit 21 contained within the first portion 91 to define an annular space that serves as the first water conduit 31. This causes the water stream, which passes through the first water conduit 31, to flow in thermal communication with the first exhaust gas conduit. The first water stream, passing from the first exhaust elbow 10 to the junction point where it combines with the second water stream, removes heat from the exhaust gas stream within the first exhaust gas conduit 21. In a symmetrical manner, the second portion 92 of the exhaust system provides the second exhaust gas conduit 22 which is centrally disposed within the second portion 92 to define an annularly shaped second water conduit 32. Although not specifically shown in FIGS. 2 and 6, it should be understood that an extension exhaust pipe can be connected to the distal end of the exhaust conduit configurations shown in FIGS. 2 and 6. This extension exhaust pipe, which would be configured to conduct a mixture of exhaust gas and water, could be constructed to allow it to swivel about a rotational axis that is generally concentric with the distal end of the exhaust system near the second junction point 42. The capability to swivel about this rotational axis allows the extension exhaust conduit to be adapted to various engine positions within a marine vessel. It could be applied to a marine vessel with two marine propulsion engines, located at the as port and starboard positions within the vessel. An extension exhaust conduit that can be swiveled about its rotational axis through the distal end of the configuration shown in FIG. 6 would provide additional flexibility in applications of the present invention.

Figure 7:
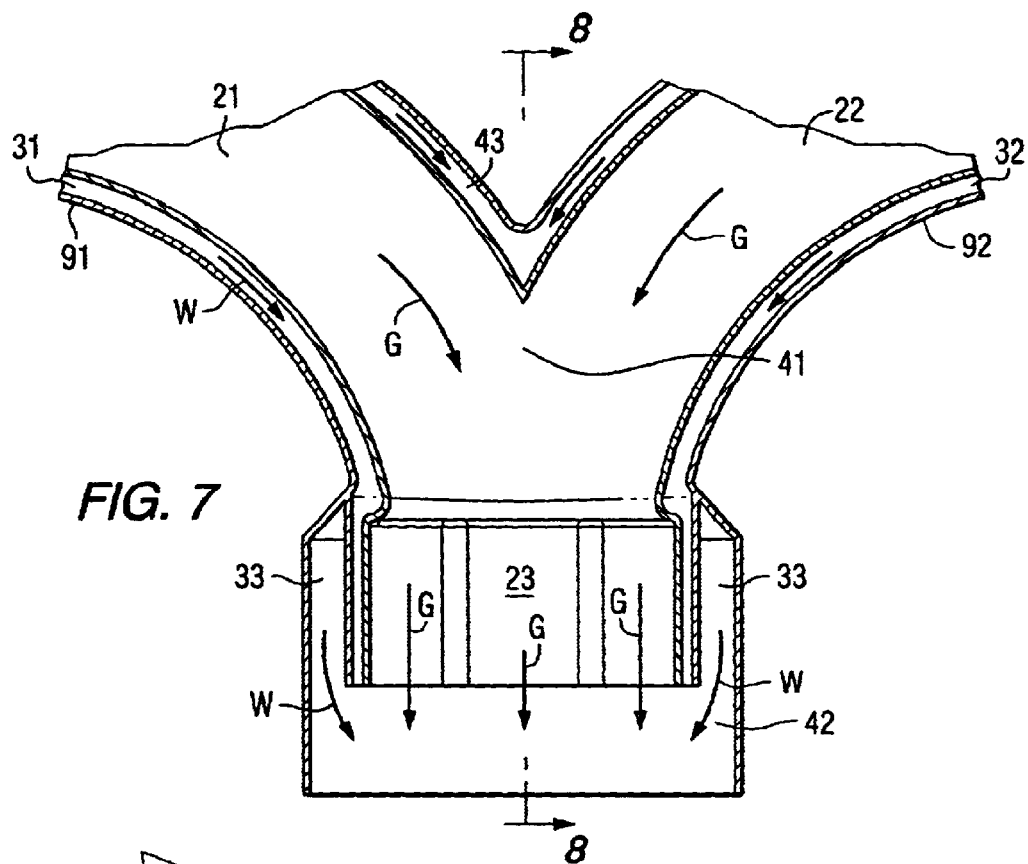
FIG. 7 is a section view of a portion of the embodiment of the present invention shown in FIG. 6.

FIG. 7 is a section view taken through the region where the first and second portions, 91 and 92, of the exhaust system are joined together in FIG. 6. With reference to FIGS. 6 and 7, the first and second exhaust gas streams meet and mix together at the first junction point 41 which defines a region where the first and second exhaust gas conduits, 21 and 22, are joined. The first and second exhaust gas streams are mixed together, where the first and second exhaust gas conduits meet to create a combined gas stream within the third exhaust gas conduit 23. It is important to note that the second conjunction point 42 is downstream, with respect to the direction of flow of both the exhaust gas stream G and the water stream W, from the first junction point 41. As a result, the first and second gas streams are mixed together and combined prior to mixing the exhaust gas with the water stream. This allows the pressure fluctuations of the first and second exhaust gas streams to combine and mitigate the maximum amplitudes of pressure pulses of these two exhaust gas streams. This mitigation of the amplitudes of the pressure pulses occurs in the region of the first junction point 41. In prior art exhaust systems, cooling water is mixed with the individual exhaust gas streams emitted by the exhaust elbows prior to connecting the two exhaust streams, from the two exhaust manifolds and exhaust elbows together. As a result, in marine exhaust systems known to those skilled in the art, the amplitude of pressure pulses within the individual gas streams is sometimes sufficient to induce a reverse flow of water through the exhaust gas conduits in a direction back toward the exhaust manifolds.

Figure 8:
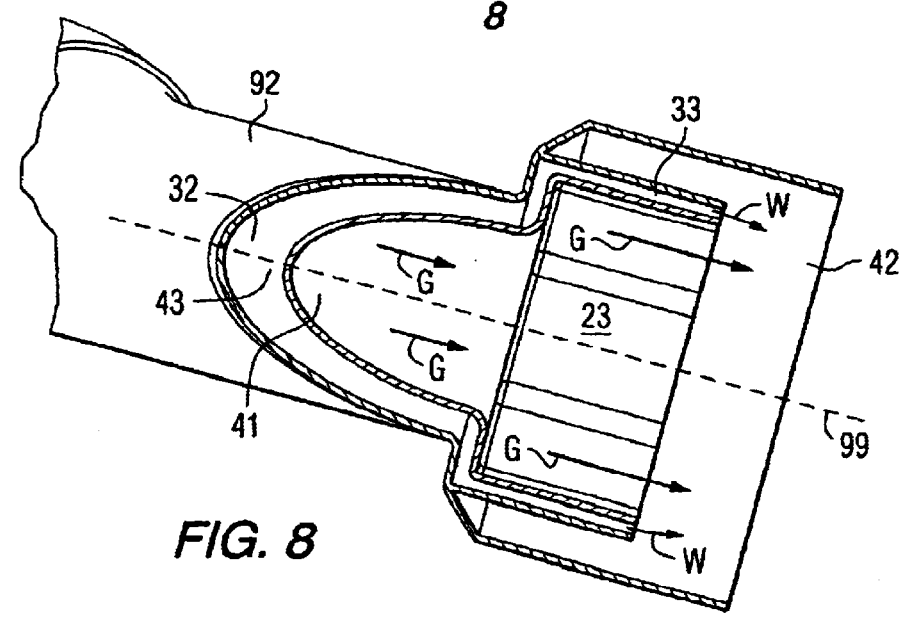
FIG. 8 is a section view of FIG. 7.

FIG. 8 is a section view of FIG. 7 showing the third junction point 43 where the first and second water streams are mixed together to flow as a combined water stream through the third water conduit 33. The first junction point 41, where the first and second exhaust gas streams are combined, is also illustrated. As the combined exhaust gas stream passes through the third exhaust gas conduit 23, it is eventually mixed with water of the combined water stream at the second junction point 42.

The section view of FIG. 8 is taken through FIG. 7 along a plane in which the rotational axis 99 exists. In FIG. 8, this rotational axis 99 is illustrated. The discussion above, in relation to the potential of adding an extension conduit to the distal end of the exhaust system of the present invention, is concentric with the generally circular shape of the distal end at the position where the second junction point 42 exists. The extension exhaust conduit would be configured to conduct a mixture of exhaust gas and water after they are combined together at the second junction point 42. The extension exhaust conduit can swivel about the rotational axis 99 to allow the final exit point of the exhaust system to be located either to the port or starboard sides of the marine engine.

The present invention causes two separate exhaust gas streams, from separate exhaust gas producing components of a marine engine to remain uncombined with cooling water until the two streams can be combined together to form a combined exhaust gas stream passing through a third exhaust gas conduit. After the first and second exhaust gas streams are combined together, the exhaust gas stream can be combined with the cooling water stream. Unlike exhaust systems known to those skilled in the art, the present invention does not allow the individual exhaust gas streams to be combined with cooling water prior to the mixing of the first and second gas streams. This characteristic of the present to invention inhibits the reverse flow of water through the exhaust system back toward the marine engine which could otherwise result from negative pressure pulses within the combined gas and water streams as is possible in exhaust systems known to those skilled in the art.

Although the present invention has been described in particular detail and illustrated to show several embodiments, it should be understood that alternative embodiments are also within its scope.

We claim:

1. An exhaust system for a marine engine, comprising:
a water cavity disposed in thermal communication with a heat producing component of said marine engine;
a first exhaust gas producing component of said engine;
a second exhaust gas producing component of said engine;
a first exhaust gas conduit connected in fluid communication with said first exhaust gas producing component of said marine engine;
a second exhaust gas conduit connected in fluid communication with said second exhaust gas producing component of said marine engine;
a first water conduit connected in fluid communication with said water cavity;
a second water conduit connected in fluid communication with said water cavity;
a first junction point at which said first and second exhaust gas conduits are connected in fluid communication with each other to form a third exhaust gas conduit; and
a second junction point at which said third exhaust gas conduit is connected in fluid communication with a water conduit from the group consisting of said first water conduit, second water conduit, and said first water conduit combined with said second water conduit said first junction point being upstream from said second junction point with respect to the direction of flow of exhaust gas through said first and second exhaust gas conduits and with respect to the direction of flow of water through said first and second water conduits.

2. The exhaust system of claim 1, further comprising:
a third junction point at which said first and second water conduits are connected in fluid communication with each other to form a third water conduit.

3. The exhaust system of claim 2, wherein:
said third exhaust gas conduit is connected in fluid communication with said third water conduit at said second junction point.

4. The exhaust system of claim 1, wherein:
said water cavity comprises a water jacket formed within a block of said marine engine.

5. The exhaust system of claim 1, wherein:
said first exhaust gas producing component comprises a first cylinder of said marine engine; and
said second exhaust gas producing component comprises a second cylinder of said marine engine.

6. The exhaust system of claim 1, wherein:
said first exhaust gas producing component comprises a first plurality of cylinders of said marine engine; and
said second exhaust gas producing component comprises a second plurality of cylinders of said marine engine.

7. The exhaust system of claim 6, wherein:
said first plurality of cylinders is disposed on a starboard side of said marine engine and said second plurality of cylinders is disposed on a port side of said marine engine.

8. The exhaust system of claim 7, wherein:
said marine engine is a V-shaped engine.

9. The exhaust system of claim 1, wherein:
said first exhaust gas conduit is disposed in thermal communication with said first water conduit between said first exhaust gas producing component of said engine and said first junction point; and
said second exhaust gas conduit is disposed in thermal communication with said second water conduit between said second exhaust gas producing component of said engine and said first junction point.

10. The exhaust system of claim 1, wherein:
said first and second water conduits are disposed in parallel relation with each other between said water cavity and said second junction point.

11. A method for controlling the flow of exhaust in an exhaust system of a marine engine, comprising the steps of:

conducting a first stream of exhaust gas from a first exhaust gas producing component of said marine engine to a first junction point;

conducting a second stream of exhaust gas from a second exhaust gas producing component of said marine engine to said first junction point;

mixing said first and second streams of exhaust gas together at said first junction point to form a combined stream of exhaust gas;

conducting a first stream of water from a water cavity of said marine engine to a second junction point, said first stream of water being disposed in thermal communication with said first stream of exhaust gas;

conducting a second stream of water from said water cavity of said marine engine to said second junction point, said second stream of water being disposed in thermal communication with said second stream of exhaust gas; and mixing said combined stream of exhaust gas, at said second junction point, with a stream of water selected from the group consisting of said first stream of water, said second stream of water, and a combination of said first and second streams of water, said first junction point being upstream from said second junction point with respect to the direction of flow of exhaust gas through said first and second exhaust gas conduits and with respect to the direction of flow of water through said first and second water conduits.

12. The method of claim 11, further comprising:

mixing said first and second streams of water together at a third junction point to form a combined stream of water.

13. The method of claim 12, wherein:

said combined stream mixing step comprises the step of mixing said combined stream of exhaust gas with said combined stream of water at said second junction point.

14. The exhaust system of claim 11, wherein:

said water cavity comprises a water jacket formed within a block of said marine engine.

15. The exhaust system of claim 11, wherein:

said first exhaust gas producing component comprises a first plurality of cylinders of said marine engine; and said second exhaust gas producing component comprises a second plurality of cylinders of said marine engine.

16. The exhaust system of claim 15, wherein:

said first plurality of cylinders is disposed on a starboard side of said marine engine and said second plurality of cylinders is disposed on a port side of said marine engine.

17. The exhaust system of claim 16, wherein:

said marine engine is a V-shaped engine.

18. An exhaust system for a marine engine, comprising:

means for conducting a first stream of exhaust gas from a first exhaust gas producing component of said marine engine to a first junction point;

means for conducting a second stream of exhaust gas from a second exhaust gas producing component of said marine engine to said first junction point;

means for mixing said first and second streams of exhaust gas together at said first junction point to form a combined stream of exhaust gas;

means for conducting a first stream of water from a water cavity of said marine engine to a second junction point, said first stream of water being disposed in thermal communication with said first stream of exhaust gas;

means for conducting a second stream of water from said water cavity of said marine engine to said second junction point, said second stream of water being disposed in thermal communication with said second stream of exhaust gas; and means for mixing said combined stream of exhaust gas, at said second junction point, with a stream of water selected from the group consisting of said first stream of water, said second stream of water, and a combination of said first and second streams of water, said first junction point being upstream from said second junction point with respect to the direction of flow of exhaust gas through said first and second exhaust gas conduits and with respect to the direction of flow of water through said first and second water conduits.

19. The method of claim 18, further comprising:

means for mixing said first and second streams of water together at a third junction point to form a combined stream of water.

20. The method of claim 19, wherein:

said combined stream mixing means comprises means for mixing said combined stream of exhaust gas with said combined stream of water at said second junction point.

* * * * *